United States Patent [19]

Toye et al.

[11] 3,836,754

[45] Sept. 17, 1974

[54] CODED CARD EMPLOYING DIFFERENTIAL TRANSLUCENCIES

[76] Inventors: Frederick D. Toye, 23511 Tiara St., Woodland Hills, Calif. 91364; Frederick N. Toye, 3853 Dixie Canyon Ave., Sherwood Oaks, Calif. 91405

[22] Filed: Sept. 18, 1972

[21] Appl. No.: 289,974

[52] U.S. Cl. .................... 235/61.12 N, 235/61.7 B, 235/61.11 E

[51] Int. Cl. .................... G06r 19/06

[58] Field of Search .............. 340/146.3 B, 146.3 F, 340/173 LT, 173 SS, 173 MA, 173 LM; 35/17; 235/61.11 E, 61.12 N, 61.12 R, 61.7 B

[56] References Cited

UNITED STATES PATENTS

| | | | |
|---|---|---|---|
| 3,148,355 | 9/1964 | Sliter et al. | 340/173 LT |
| 3,186,111 | 6/1965 | Lawlor | 35/17 |
| 3,245,697 | 4/1966 | Nugent | 235/61.7 B |
| 3,305,669 | 2/1967 | Fan | 340/173 LT |
| 3,328,563 | 6/1967 | Kollar | 235/61.11 E |
| 3,471,684 | 10/1969 | Berezov | 235/61.11 E |
| 3,686,480 | 8/1972 | Bowerman | 235/61.12 N |

*Primary Examiner*—Thomas A. Robinson
*Attorney, Agent, or Firm*—Owen, Wickersham & Erickson

[57] ABSTRACT

A translucent but not completely transparent card providing one or more areas or data zones where the light transmissivity through the card significantly differs from the overall light transmissivity of the card. At least two levels of light transmissivity are used in an assortment of cards with both levels being different from that of the card itself as well as from each other. A series of such levels may be used in a system with sensors that detect different levels of light transmissivity. A plurality, large or small, of such data zones may be used in either static or dynamic systems and with digital or other types of coding, enabling a large number of differentiable data to be put on any one of a series of cards and making counterfeiting very difficult. The cards may be plastic with fused-together laminations, and the data zones may be provided on one of the inner laminations, or it may be paper with the data zones provided by surface printing.

21 Claims, 9 Drawing Figures

CODED CARD EMPLOYING DIFFERENTIAL TRANSLUCENCIES

BACKGROUND OF THE INVENTION

The invention relates to cards bearing data that are read in terms of optical density or transmissivity. The cards may be credit cards, identification cards, tickets or gate operators, or may be used for any other purpose. They may bear visual information such as printing or photographs in addition to the concealed information provided by this invention, which is readable only by specially prepared devices. Location and density are the primary parameters employed, whether there be only one key location or many and whether there be only one key density or several.

The problems of security checks, credit confirmation, and the operation of gates, locks, and other devices have become more and more acute with enterprises employing large numbers of people passing in and out of gates, with apartment houses having many tenants wishing to gain quick access to the building or garage — and with other persons wishing to gain the same access but for wrong reasons and without entitlement — with credit card counterfeiters, and with the many other places where tickets and cards are used for identification.

Security check cards and identification cards began with simple printed cards giving a person's name and something indicating proper authorization. They were easy to imitate and forge, so that additional information was added, and then photographs were affixed thereto. All of these cards were easily counterfeited by simply copying the form of the cards and typing or printing information on them in the manner of the original, while photographs could be genuine, but of a person not really entitled to admission. Progress brought cards made from paper placed between two sheets of plastic and, later, laminated all-plastic cards fused together. These were sufficient where the methods for reproducing them were not generally available, but as these methods became more available, methods relying on photographs and other visual information and on fusing laminations, while still having their value, became less than fully satisfactory.

More recently, magnetic information in the form of punched out sheets of ferromagnetic metal were inserted between laminations or printed spots of ferromagnetic material were printed on or below the surface, and other types of punched information with punching through cards came into use. Punches that are visible present no difficulties for a counterfeiter, while magnetic systems were subject to simple analysis by merely taking the card apart, and then the card could be counterfeited.

There has long been a need for a card which was much more difficult to counterfeit, one which the counterfeiter could only with great difficulty analyze.

The use of various key cards to open gates or actuate other mechanism has recently become of great importance. Magnetic cards, again, have been used, but one of the difficulties that they and the other prior-art cards have is that they provide relatively few possible combinations, because of the relatively large magnetic areas required and because of the wide spacing required between successive ferromagnetic areas. Thus, many of these cards can be keyed to one or a few of only a few thousand possibilities, and there may have to be duplications by different customer groups. The areas of use of the same code may be geographically distant from each other, but the users of any such group cannot be assured of complete uniqueness. There has been a need for a simple card that could contain millions of possibilities, all in a form that is instantly detectable by proper apparatus and instantly useable for actuating things, yet not detectable and not actuable unless the exact combination is obtained.

Among the objects of the present invention are those of providing a wide variety of types of cards, all operating on a principle that enables a large number of possible combinations and that also makes it very difficult for counterfeiters to reproduce any one of them. Various other objects and advantages will appear from the following description.

SUMMARY OF THE INVENTION

The invention comprises a translucent card which is not transparent. In a preferred form the card may be laminated plastic, the laminations being fused together into a single unitary card. One of the inner laminations contains the code, which may be one or more data zones — small spots or areas in which the light transmissivity, which is substantially uniform through the card as a whole, is changed to a predetermined differentiable level.

In a preferred form of the invention, the light transmissivity at the data zones is less than that of most of the card. In this form, if there is any information coded on the card at all, the light transmissivity is always reduced, and any one card has one of two different levels of light transmissivity at each data zone, both different from that of the card as a whole or has one of a whole series of steps of transmissivity, each of which has code significance.

In an inexpensive, though less secure form of the invention, the card may be paper and the data zones provided by printing on the surface, preferably as part of an overall design that helps to conceal the location of the data zones.

In some forms of the card, a single area or spot will be sufficient, utilizing in the preferred system at least two levels of light transmissivity. The card is read by equipment which can detect the difference between each of these two levels of transmissivity, and can also detect the difference between each of these and the levels of light transmissivity expressed by a total transparency (such as is made by a hole through a card) and the transmissivity of the card as a whole. In more complex systems, not only is there a plurality of such spots or areas, but they may be used with several different levels of transmissivity, all detectable from one another and from that of the card itself as well as from a void.

The reading apparatus for this type of card may be any type of light transmissivity sensor having sufficient sensitivity for the cards with which it is used. It may be one which reads all the information simultaneously or one which reads it sequentially, but rapidly, in a rapid pulse electronics setup sequence.

DESCRIPTION OF SOME PREFERRED EMBODIMENTS

Figure 1:
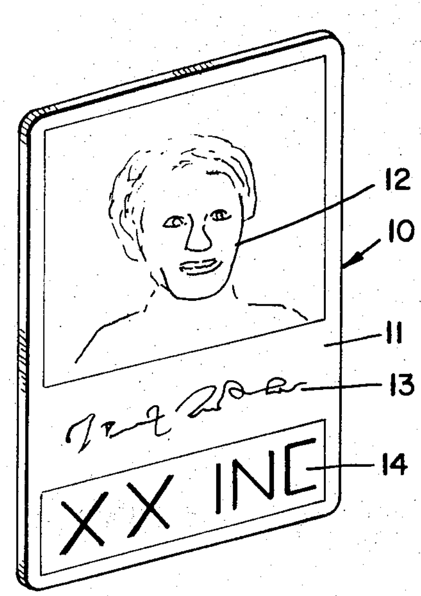
FIG. 1 is a view in perspective of an identification card embodying the principles of the invention as viewed exteriorly.
Figure 2:
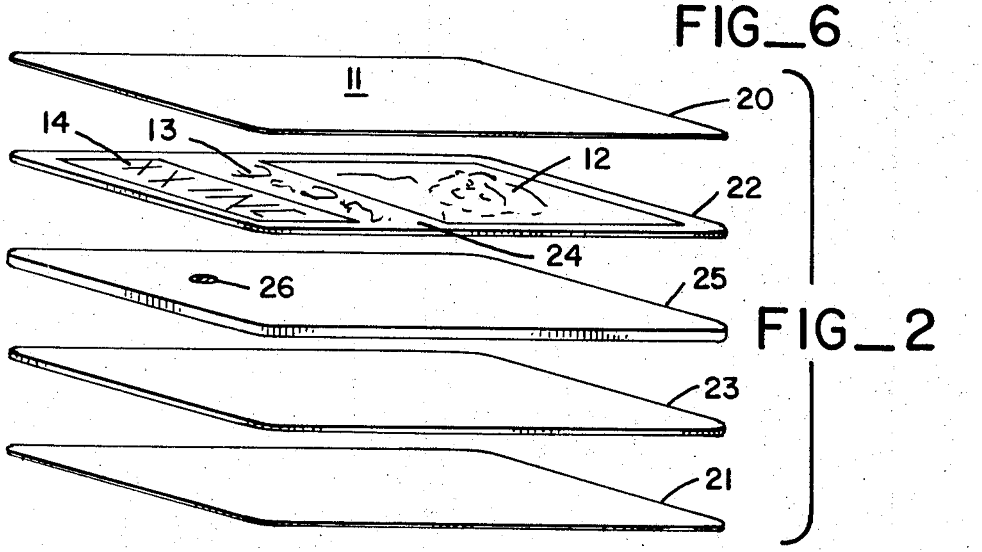
FIG. 2 is an exploded view in perspective of the card of FIG. 1 before the laminations are fused.

FIGS. 1 and 2 illustrate a typical card 10 embodying the principles of the invention. Through its front face 11 may be seen a photograph 12 of the person, together with his signature 13 and information 14 identifying the issuer of the card. On the reverse side, the card 10 may present additional information about proper use of the card or about the user. All of these may be printed information. The card 10 to all appearances is an ordinary plastic card. It is not transparent but is translucent, preferably highly so, e.g. about 80 percent transmissivity. Thus, it may be made of a white plastic which, of course, scatters light, such as polyvinyl acetate or polyvinyl chloride.

FIG. 2 illustrates a typical structure for a preferred form of the card 10 of this invention, in which there are five laminations. On the top and on the bottom are thin sheets 20 and 21 of clear transparent plastic, which may be polyvinyl chloride or polyvinyl acetate or other suitable clear plastic. For example, each of the laminations 20 and 21 may be 0.0015 inch thick. These are the encasing or covering members which are designed to prevent tampering with the photograph 12 and other printed information.

Next to each one of these sheets 20 and 21 of clear plastic which scatters light and is a sheet 22 or 23 of white plastic, which may be, again, polyvinyl chloride or polyvinyl acetate or other suitable plastic material, and each of these may be printed on its outer surface 24 so that it shows through the transparent lamination 20 or 21. The photograph 12, signature 13, indicium 14, etc. may be included. For example, each one of these laminations 22, 23, may be made of 0.005 inch white vinyl material. In this invention careful control of transmissivity is important, because it is very important for these white vinyl members 22, 23 to have a uniform and predetermined light transmissivity. This light transmissivity may be changed by the amount of white pigment incorporated, but it is important that it be kept to a known and predetermined level in all cases. This not only is important for the actuation of the device but is also one key to the maintaining of proper security, since a successful counterfeiter would also have to achieve good control of the light transmissivity of each lamination of the card.

Between the two white vinyl sheets 22 and 23 are one or more other laminations. In the simplest case, and probably the most useful case, there is a single lamination 25, which may be called the coded lamination, or coded sheet. This sheet 25, for example, may be made from 0.010 inch white vinyl material, careful control of transmissivity again being very important.

Figure 3:
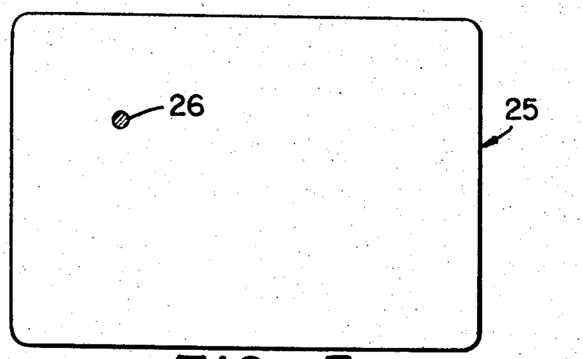
FIG. 3 is a plan view of one form of center lamination or core lamination embodying the principles of the invention and having only a single geometrically located area providing a transmissivity code.

The coded lamination 25 is provided with one or more data zones, dots or areas, some of which may be dummy areas not in use at all, just to make it more difficult for a counterfeiter to detect which is the real one. There may be only one such data zone 26, as shown in the form of the invention illustrated in FIGS. 2 and 3. In any case, this data zone 26 may be round, square, or any other desired shape and may be as small as 1/16 inch in diameter or as large as a quarter-inch in diameter, or even larger if that be desired. An important feature of the invention is that each data zone have a precise geometric location. For example, a 1/16 inch zone could be at any of an infinite number of centers. On a grid basis a card that is 2 by 3 inches would provide 1,536 different areas that are 1/16 inch square. To get the proper responses, each data zone in any card has to be located in a predetermined key location.

The data zone 26 imparts to its portion of the card a light transmissivity differentiated from the light transmissivity of the card 10 as a whole and this differentiation may be achieved by any of several methods. Thus, the coded lamination 25 may have one or more holes through it, and in each of these holes may be affixed a colored gelatin or a plastic colored filter having a specified color and a specified light transmissivity for a particular kind of light. In place of colors, gray filters of various light transmissivities may be used. Instead of holes and filters, printer's ink, black or in color, may be used, to give various light transmissivities which may or may not be related to color. Various other applications of gray or color may be used. The data zone 26 may be a thinned portion or a clear portion that increases the transmissivity of light passing through the card 10 at that location. Each data zone 26 provides a level of light transmissivity which is distinctly different from that of either the light transmissivity of the card as a whole or that of a hole through the card 10. In a preferred card, the actuating code is on a still different level of light transmissivity from a non-actuating but distinct density provided at every data zone whether or not the actuating code is present; that is, all data zones may be printed with ink, but some of them may be over-printed to give the actuation density.

For example, the card 10 itself as a whole may have a light transmissivity of 80 percent, i.e., transmitting 80 percent of the light incident upon it. This differentiates it from the 100 percent transmisssivity through a slot or void. The areas to be detected may be an area having 50 percent light transmissivity in one case and only 20 percent light transmissivity in another case. This latter case may be the actuating level.

Figure 4:
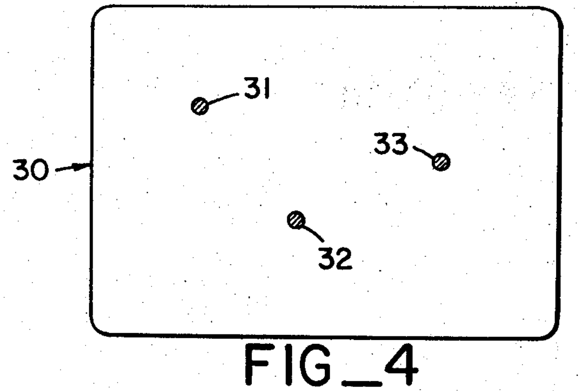
FIG. 4 is a plan view of a modified form of code lamination embodying the principles of this invention in which there are three precisely located spots providing the code.

A code lamination sheet 30 shown in FIG. 4 has three data zones 31, 32 and 33, each of which may have one of four different light transmissivities (each different from that of the card and from that of a void). A reading device for this device would have sensor means correspondingly adjusted to provide sensitivity to each of these four data levels while differentiating each of those from both the total void and the light transmissivity of the card itself and also from total opaqueness.

Figure 9:
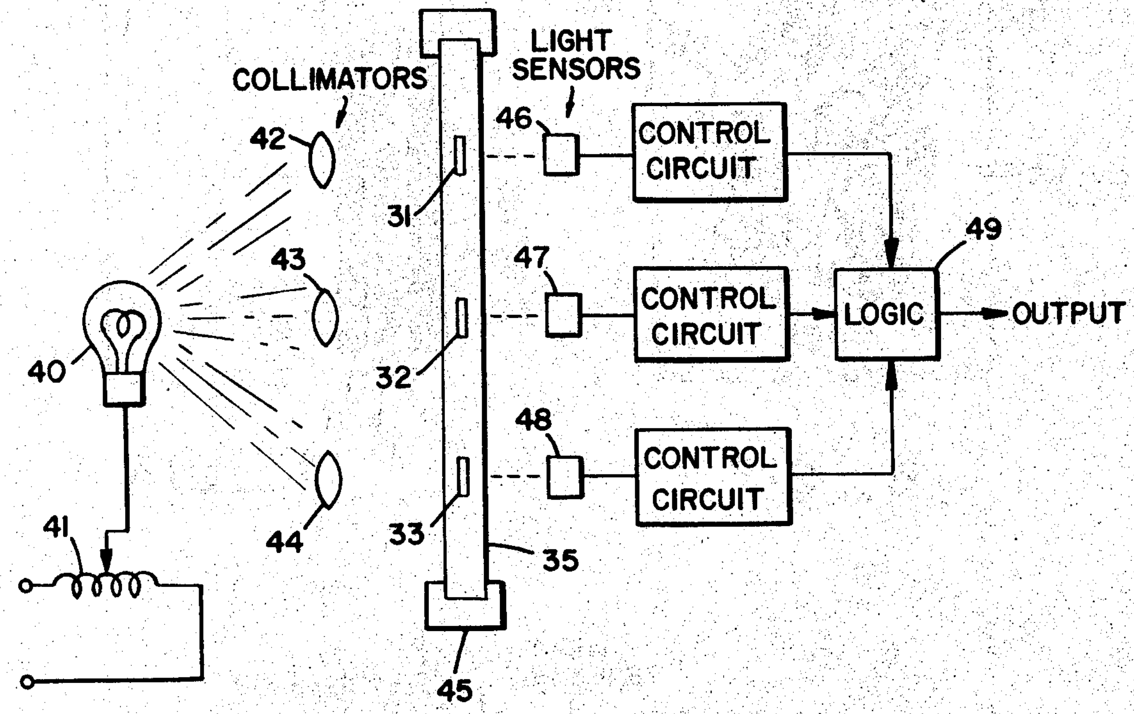
FIG. 9 is a diagrammatic view of card reading apparatus for this invention.

FIG. 9 shows a typical arrangement for a simple form of card reader for reading three data zones, as in the code of FIG. 4. A light source 40 is provided with power through a rheostat 41 so that its light productivity in lumens may be brought to a desired level. Collimators 42, 43 and 44 provide three light beams aligned with the data zones 31, 32 and 33 of a card 35 incorporating the code sheet 30. The card 35 is held by a frame 45 which aligns the card 35 so that the exact geometrical positions of every portion of the card 35, including the data zones 31, 32 and 33 are precisely located. The alignment means of the frame 45 may comprise simple plates and flanges and a frame area, and the card 35 may be placed in a predetermined manner known to the operator of the device and not indicated either by the card 35 itself or by the machine.

On the opposite side of the card 35 from the light source 40 are shown three light sensors 46, 47 and 48, each one of which is set to respond to a predetermined transmissivity. For example, one sensor 46 may respond to a light transmissivity of 50 percent plus or minus 5%. Another sensor 47 to 20 percent plus or minus 5 percent and the third to a level of 35 percent +5 percent. Each sensor 46, 47 and 48 activates a control circuit when the data zones are of the correct transmissivity level, and the control circuits, in turn, act through circuit logic 49 — all of which are of well known type — to produce a desired output. This may be simply lighting a single lamp or may open a gate or may do practically anything desired.

This simplified card reader may be expanded by having a large number of sensors, each covering one particular area and it may also be expanded by having sensors that give different responses for each of several different levels of light, so that there may be a number of stages of light. Alternatively, it may be further simplified to a single sensor for use with the card 10.

Figure 5:
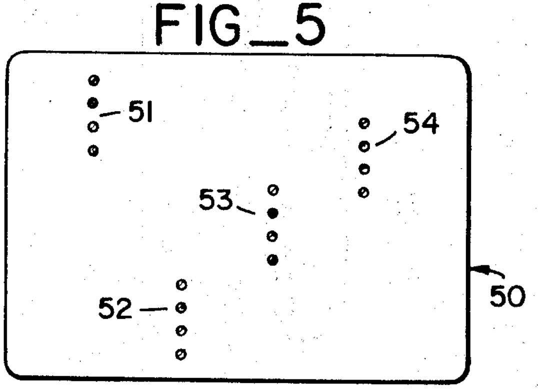
FIG. 5 is a plan view of a more complex code having a greater number of spots providing a digital code.

A digital system may be provided with a card having a code sheet 50 shown in FIG. 5 in which a four-digit system is provided by 16 spots. The spots are arranged in four groups 51, 52, 53 and 54, each of which acts as a four-bit system for determining one digit in a binary code, so that each of the two levels indicates either a one or a zero in the binary code, and the four spots of any group taken together represent one digit. Then the four series of spots represent four digits.

By having more than two different intensities coded on the card, it is possible to use fewer spots to get the same effect.

Figure 6:
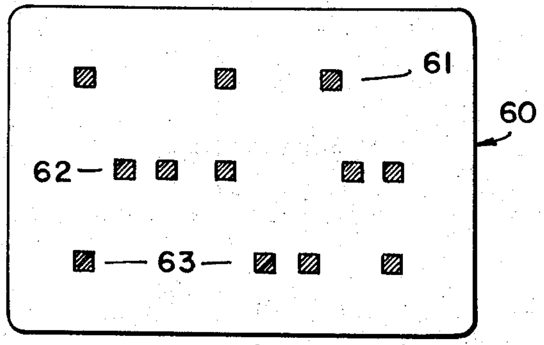
FIG. 6 is a plan view of a still different code lamination having additional information located in rows.

FIG. 6 provides a coded laminator 60 that can be used with a clocked type of reader to read the numbers serially in any desired order. The card itself would not indicate the order, but the machine would be set up to read everything in a particular order or to change the order if desired, and this could give a direct actuation within microseconds of the time the card is inserted. Here there are three rows 61, 62 and 63 of data zones; one row 61 has three data zones, the row 62 has five data zones, and the row 63 has four data zones. How many bits this provides depends on the number of transmissivity levels.

Since each of the dots or spots need only be 1/16 inch in diameter, it is clear that there can be, for example, 256 of these spots in a 1-inch area and such a 1-inch area could be located any where with respect to the card. Millions of combinations thus become possible.

The use of different transmissivities can be very effective, because to the eye the data zones are not very clearly differentiated from each other. One may think that one spot looks the same as the other, whereas actually the transmissivity may differ considerably. Even densitometers of different types may measure them differently. Also, by the use of different colors the possibilities are also increased, for a monochromatic light source may be used in connection with sensors to still give indications in terms of tranmissivity but for different colors of light, so that for example under a green light the system may be coded for one response and under red light coded for another response, and the card may give both responses.

Figure 7:
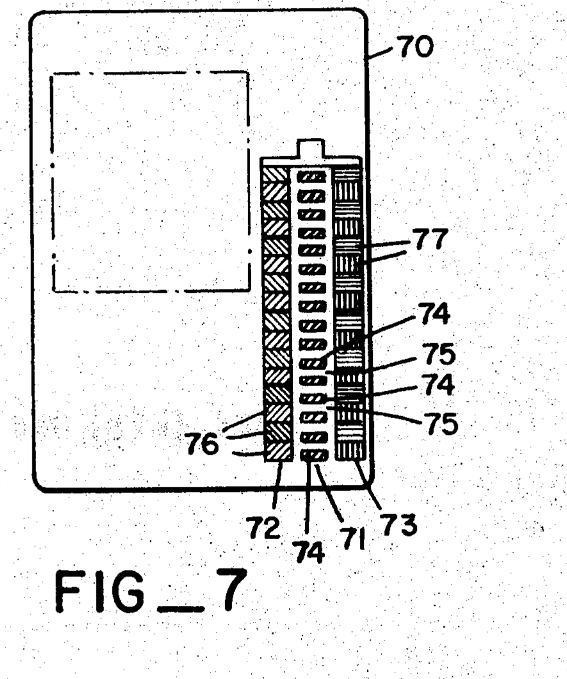
FIG. 7 is a plan view of the code sheet of a modified form of card for use in a dynamic reading system.

FIG. 7 shows a code sheet 70 for another modified form of card which is used with a dynamic reading system. For security protection, it is generally preferred that this sheet 70 be incorporated into a laminated card with all laminations fused together. (For example, the portion 25 of FIG. 2 may be made as two sheets having printing on one surface that is faced in against the other sheet to increase the degree of protection). However, the basic thing in a card incorporating the code sheet 70 is the use of a relationship between a clock pulse row of data acquisition zones and the data zones themselves.

Thus, the card 70 has three rows 71, 72 and 73 of zones that are used in a light transmissivity system. It could, of course, have only two rows or could have more than three, but two would be the minimum for this type of card. One row 71 is a data acquisition row which serves to actuate the system. In this particular instance there is a row of 16 dark portions 74 separated from each other by 15 lighter portions 75. Each of the portions 74 is of the same width and is separated from its succeeding portion 74 by a portion 75 of approximately the same width. This may be of different widths but it may be less efficient. It is preferred that the zones 74 be uniform and alike and evenly spaced, but that is not essential, although it does make it easier to combine their actuation with the data zones.

The purpose of these particular zones 74 and 75 is to read from an "on" to an "off" position to initiate reading or to form pulses in a device which times the reading of the parallel rows 72 and 73 of data zones. Thus, the row 72 has a series of data zones 76 which may be substantially continuous but which have different transmissivities. For the simplest case, it will be assumed that the only transmissivities involved are two, one of which represents a zero and the other of which represents a one in a binary system. These differ from the overall transmissivity of the card, they differ from a total blackout, and they differ from a total opening or transparency in their light transmissivities. They are used in conjunction with reading apparatus which is able to differentiate all the transmissivities concerned. One row 72 may be sufficient for many purposes, but the two-row system is given as an example. In this instance, the row 72 may represent, for example, by its data zones 76, the code of the company or agency which has charge of the card, and the other row 73 represents by its data zones 77 the code of individual employee. The data zones 76 and 77 are 16 in number so that they may be considered as four successive data groups each having a one-bit, a two-bit, a four-bit, and an eight-bit in a binary coded decimal system.

During operation the card bearing the concealed code sheet 70 is put into a dynamic reader, and each of the data acquisition zones 74 gives a pulse, which triggers the reading of its accompanying data zones 76 and 77. The reading of the data zones 76 and 77 is used then to identify the genuineness of the card as to the agency and the genuineness of the number as to the individual who, in a preferred form of this system, also verifies his number by punching it out on a keyboard, which goes into a memory system that compares the two and permits the passage of the individual only when the card is proved genuine and when the card number corresponds to the number which the individual feeds into the keyboard.

Figure 8:
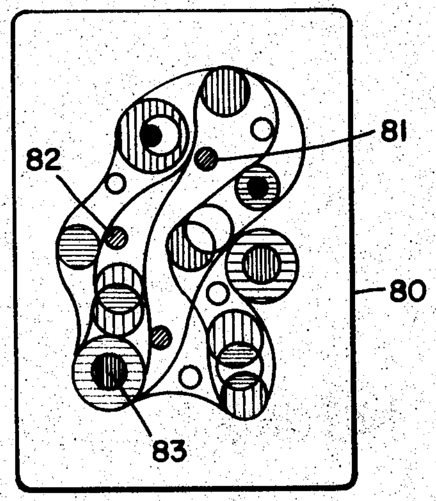
FIG. 8 is a top plan view of a simple ticket forming a modified form of the invention as a simple printed card with some of the printing being used to disguise the location of the coded portions.

Another form of the invention is shown in FIG. 8. This is a very simplified form of the invention, where a card 80 may be a paper ticket, without any plastic facing. Three data zones 81, 82 and 83 are printed on the card in carefully located positions but the data zones 81, 82 and 83 are preferably camouflaged in part by the use of other printing on the card, which clocks the location of the data zones. This may be done by various designs, by uses of color, and so on. For example, a strip of successive colors arranged like a rainbow can be used with only one, two and three of those colors having any meaning as far as the identification feature of the ticket is concerned. Similarly, the design may be done in monochrome with gray areas having various parts that are of different transmissivities than others. This may be made relatively cheaply for a single-use purpose or for use over a short period of time, for example a week as a commutation ticket, and still embodies the same basic principles of this invention, though of course in a somewhat less secure form than where the code is completely hidden in the middle of a transparent laminated card.

Other features may be incorporated into the card. For example, the card may be combined with punch holes; for example, the data acquisition of the card of FIG. 7 could be provided by punch holes in the same design as that shown for the center row 71 and used to provide the timing for the card. Thus, this card would then be partly a punch hole card read in conventional means and partly a card operating on the principles of the present invention. Similarly, the card of this invention may be combined with magnetic means. For example, an anti-passback card could be made which operates to admit a card to a parking lot upon presentation of the card. The identification of the card is secured by means of the present invention with the card being read by various transmissivities. However, this card might include a magnetic portion which is at the same time subjected to a magnetic field that changes its polarity so that a card will not be accepted having this opposite polarity and therefore there is a dual test. In order for the card to be used again, the polarity must be reversed again, as it will be on an out gate but will not be if used successively on the in gate. Thus, a person who is entitled in the place cannot pass his card on to others and enable four or five additional persons to park in there because in order for one to park, he must first use the out gate.

It will already be apparent from the invention that it is not limited to identification cards but is usable for tickets, tokens, badges, and other kinds of devices that are presented for machine reading with the aid of transmissivity discrimination.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A translucent card comprising a translucent member having substantially uniform light transmissivity of predetermined value greater than an opaque card and less than a void, and at least one specifically located portion on said card providing translucent light transmissivity through said card of a value preselected from a plurality of values of significantly differentiated light transmissivities, each significantly differentiated from full transparency and from the transmissivity of said card elsewhere than at said specifically located portion.

2. The card of claim 1 having a plurality of said portions of differentiated light transmissivity.

3. The card of claim 1 wherein said transmissivity is keyed to a particular color of light.

4. The card of claim 1 wherein said card is paper and each said specifically located portion is printed thereon and reduces the light transmissivity with respect to unprinted portions of said card and an overall design camouflaging each said specifically located portion is also printed thereon.

5. The card of claim 1 wherein said card is laminated and fused into a single entity and each said specifically located portion is located within an interior portion of said card inaccessible from the surfaces thereof.

6. A translucent plastic card comprising a translucent member having an overall substantially uniform light transmissivity greater than an opaque card and less than a void and having at least one specifically located portion providing translucent light transmissivity through said card of a value preselected from a plurality of values of significantly differentiated light transmissivities, each significatly differentiated from full transparency and from said overall uniform transmissivity of said card.

7. The card of claim 6 having a plurality of said portions of differentiated light transmissivity.

8. A non-transparent, imperforate, light-scattering, translucent, laminated card having a substantially uniform light transmissivity over much of its area and having at least one area inside said card inaccessible from the surface providing a data zone for said card with light transmissivity distinguishable from said uniform transmissivity and doing so in one of a plurality of differentiable transmissivities.

9. The card of claim 8 wherein all said laminations are plastic and all said laminations are fused together into an integral, inseperable whole.

10. The card of claim 8 having a plurality of said data zones.

11. The card of claim 10 wherein said data zones are grouped to provide a binary coded decimal system.

12. The card of claim 10 having a plurality of rows of said data zones.

13. The card of claim 12 wherein one said row is a data acquisition zone for timing another said row parallel thereto.

14. The card of claim 8 wherein said transmissivities are keyed to at least one narrow range of light wave lengths.

15. An imperforate card comprising:

a plurality of plastic layers fused together and including a pair of outer transparent layers providing the two faces of said card, a pair of next-to-outer light-scattering translucent layers next to said transparent layers, at least one of them carrying visible information, and a light-scattering translucent core layer between said next-to-outer layers;

the fused-together layers providing a substantially uniform basic light transmissivity therethrough;

said core layer providing at specific geometric locations at least one spot adjusting the transmissivity of light through an area of said card to a predetermined level chosen from a plurality of differentiated transmissivities.

16. The card of claim 15 having a plurality of said spots.

17. The card of claim 16 wherein said spots are grouped in a digital code.

18. The card of claim 15 wherein said spots are grouped in rows.

19. An identification system including in combination:

a series of translucent identification cards, each comprising a translucent member having a uniform light transmissivity of predetermined value greater than an opaque card and less than a void, and having at least one specifically located portion providing translucent light transmissivity through said card of a value preselected from a plurality of values of significantly differentiated light transmissivities, each significantly differentiated from full transparency and from the transmissivity of said card, and a card reader having means for reading the transmissivity level of each of said portions of any such card and means for indicating said levels in terms of a decoding indicium.

20. The system of claim 19 having a plurality of said data zones.

21. An identification system including in combination:

a series of non-transparent, translucent, light scattering identification cards each made from laminated plastic and each having a substantially uniform light transmissivity over much of the area and having in between opposite faces of the card a concealed portion inaccessible from the surface, providing a series of small specifically located areas providing data zones each with light transmissivity differentiated from said uniform transmissivity and doing so in one of a plurality of differentiable transmissivities, and a card reader having means for reading the transmissivity level of each of said areas of any such card and means for indicating said levels in terms of a decoding indicium.

* * * * *